(12) United States Patent
Miyajima

(10) Patent No.: US 6,961,142 B2
(45) Date of Patent: Nov. 1, 2005

(54) DIGITAL IMAGE READING APPARATUS

(75) Inventor: Masami Miyajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 844 days.

(21) Appl. No.: 09/781,288

(22) Filed: Feb. 13, 2001

(65) Prior Publication Data
US 2002/0015189 A1 Feb. 7, 2002

(30) Foreign Application Priority Data

Feb. 15, 2000 (JP) .................................... 2000-036010
Feb. 8, 2001 (JP) .................................... 2001-032693

(51) Int. Cl.[7] ............................ H04N 1/00; G06F 13/00
(52) U.S. Cl. ...................... 358/1.15; 358/442; 358/404
(58) Field of Search ............................. 358/1.15, 442, 358/404

(56) References Cited

U.S. PATENT DOCUMENTS 5,502,576 A * 3/1996 Ramsay et al. ............. 358/444
5,508,820 A * 4/1996 Kabeya ....................... 358/404
6,717,694 B1 * 4/2004 Fukunaga et al. .......... 358/1.16

FOREIGN PATENT DOCUMENTS

| JP | 61-296853 | 12/1986 |
| JP | 10-257119 | 9/1998 |
| JP | 11-017855 | 1/1999 |

* cited by examiner

Primary Examiner—Kimberly Williams
Assistant Examiner—Charlotte M. Baker
(74) Attorney, Agent, or Firm—Oblon, Spivak, McClelland, Maier & Neustadt, P.C.

(57) ABSTRACT

A digital image reading apparatus is provided, which apparatus includes a reading part for optically reading an image of a document to output digital image data, a first setting part for setting a reading rate in a given scanning direction to a desired value, an image memory for temporarily storing the image data, a second setting part for setting parameters related to reading the image of the document based on communication with an external apparatus, and a computation part for computing a total amount of the image data from the parameters, wherein the first setting part sets the reading rate based on the total amount of the image data.

14 Claims, 3 Drawing Sheets

DIGITAL IMAGE READING APPARATUS

BACKGROUND OF THE INVENTION

1. Field of the Invention

The present invention relates to digital image reading apparatuses such as digital copying machines or image scanners, and more particularly to a digital image reading apparatus including a stepping motor.

2. Description of the Related Art

In a conventional digital image reading apparatus reading a document image and transferring the image data to an external apparatus such as a host computer via an interface such as small computer system interface (SCSI), a document reading rate is determined to be a unique value by preset reading density. A rate of transferring the image data to the external apparatus receiving the image data (hereinafter referred to an image data transfer rate) is fixed by a data processing rate of the external apparatus. Therefore, in the case of transferring a certain amount of image data determined by reading density and a reading area from the digital image reading apparatus to the external apparatus, the image data is transferred to the external apparatus without a delay if the image data transfer rate is higher than the document reading rate. However, if the image data transfer rate is lower than the document reading rate, the image data is temporarily stored in memory housed in the digital image reading apparatus, and the stored image data is transferred in accordance with the image data transfer rate.

In general, the transfer of image data from the digital image reading apparatus to the external apparatus is performed in the following procedure. In step 1, image data read by a reading unit is stored in image memory of a DRAM. In step 2, the image data is transferred from the image memory of the DRAM to the external apparatus. The steps 1 and 2 are performed in parallel. However, there is a difference between a rate of storing the image data into the image memory (hereinafter referred to as an image data storing rate) and the image data transfer rate. Therefore, the image data is gradually accumulated in the image memory if the image data transfer rate is low or the reading of the image data is performed with high density. Since the storage capacity of the image memory is limited, the reading of the image data should be suspended at a certain point.

As a scanning system motor or a document conveying system motor of the digital image reading apparatus, a stepping motor is frequently employed. In controlling the stepping motor, a speed control operation of gradually decreasing the speed of the stepping motor is performed since the stepping motor is characteristically prevented from making an instant stop. At a point when room is generated in the storage capacity of the image memory as the image data is transferred to the external apparatus after the suspension, the stepping motor is driven again by canceling the suspension so that the reading operation is resumed. In resuming the reading operation, a speed control operation of gradually increasing the speed of the stepping motor is performed since the stepping motor is characteristically prevented from being driven instantly.

However, if the image data storing rate is relatively higher than the image data transfer rate, the above-describe speed control operations are sometimes repeated a number of times in a single reading operation. Obviously, a better image quality can be obtained by a reading operation at a constant rate than by a reading operation including the above-described speed control operations. Therefore, frequent occurrence of such a situation may deteriorate the image quality (quality of the read image) to a considerable extent. Indeed, an increase in the storage capacity of the image memory can lower the occurrence frequency of the above-described speed control operations, but at the same time, incurs rising costs.

Therefore, in a reading operation expecting a large data transfer amount of image data, such as a color or multivalue reading operation, a reading rate is preset to be lower than that of a binary reading operation so that the data transfer amount becomes equal to or approaches a read data amount.

However, in the reading operation expecting a large data transfer amount of image data, such as a color or multivalue reading operation, the reading rate is preset to be lower than that of the binary reading operation irrespective of the total image data amount of read image. Therefore, a reading time becomes longer, thus lowering the performance of the apparatus.

SUMMARY OF THE INVENTION

It is a general object of the present invention to provide a digital image reading apparatus in which the above-described disadvantages are eliminated.

A more specific object of the present invention is to provide a digital image reading apparatus that allows a minuter setting of a vertical scanning reading rate based on a total image data amount of a read image and also allows a reading time to be shorter to increase its performance even in the case of a color or multivalue reading operation expecting a large data transfer amount.

The above objects of the present invention are achieved by a digital image reading apparatus including a reading part for optically reading an image of a document to output digital image data, a first setting part for setting a reading rate in a given scanning direction to a desired value, an image memory for temporarily storing the image data, a second setting part for setting parameters related to reading the image of the document based on communication with an external apparatus, and a computation part for computing a total amount of the image data from the parameters, wherein the first setting part sets the reading rate based on the total amount of the image data.

The above objects of the present invention are also achieved by a digital image reading apparatus including an optical reader optically reading an image of a document to output digital image data, a memory temporarily storing the image data from the optical reader, and a controller computing a total amount of the image data of the document and controlling a reading rate in a given scanning direction on the basis of the total amount of the image data stored in the memory.

According to the above-described apparatuses, the reading rate in the vertical scanning direction is set based on the total amount of the image data computed based on the parameters related to reading the image of the document. Therefore, the reading rate in the vertical scanning direction can be set more minutely based on the total amount of the image data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention. In this embodiment, a digital image reading apparatus of the present invention is applied to an image scanner 100 that is connected for use to a host computer that is an external apparatus.

Figure 1:
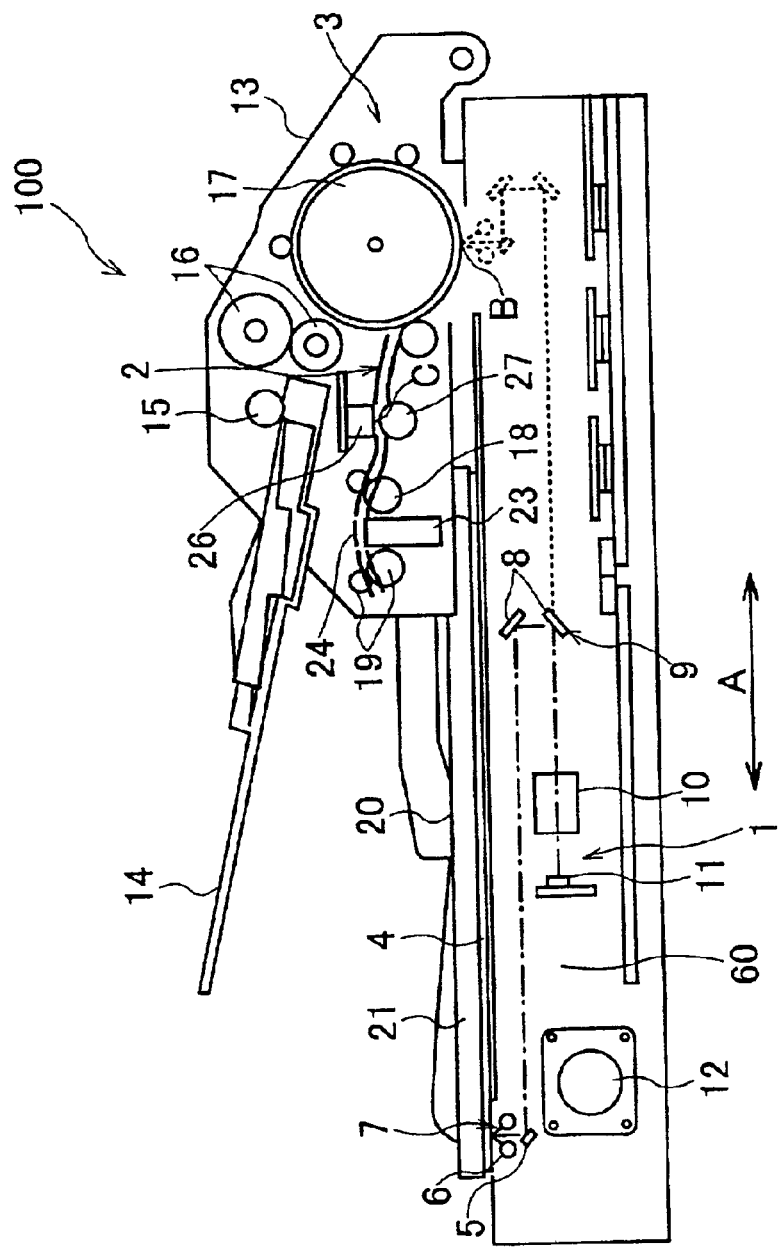
FIG. 1 is a schematic longitudinal sectional view of an image scanner of an embodiment of the present invention.
Figure 2:
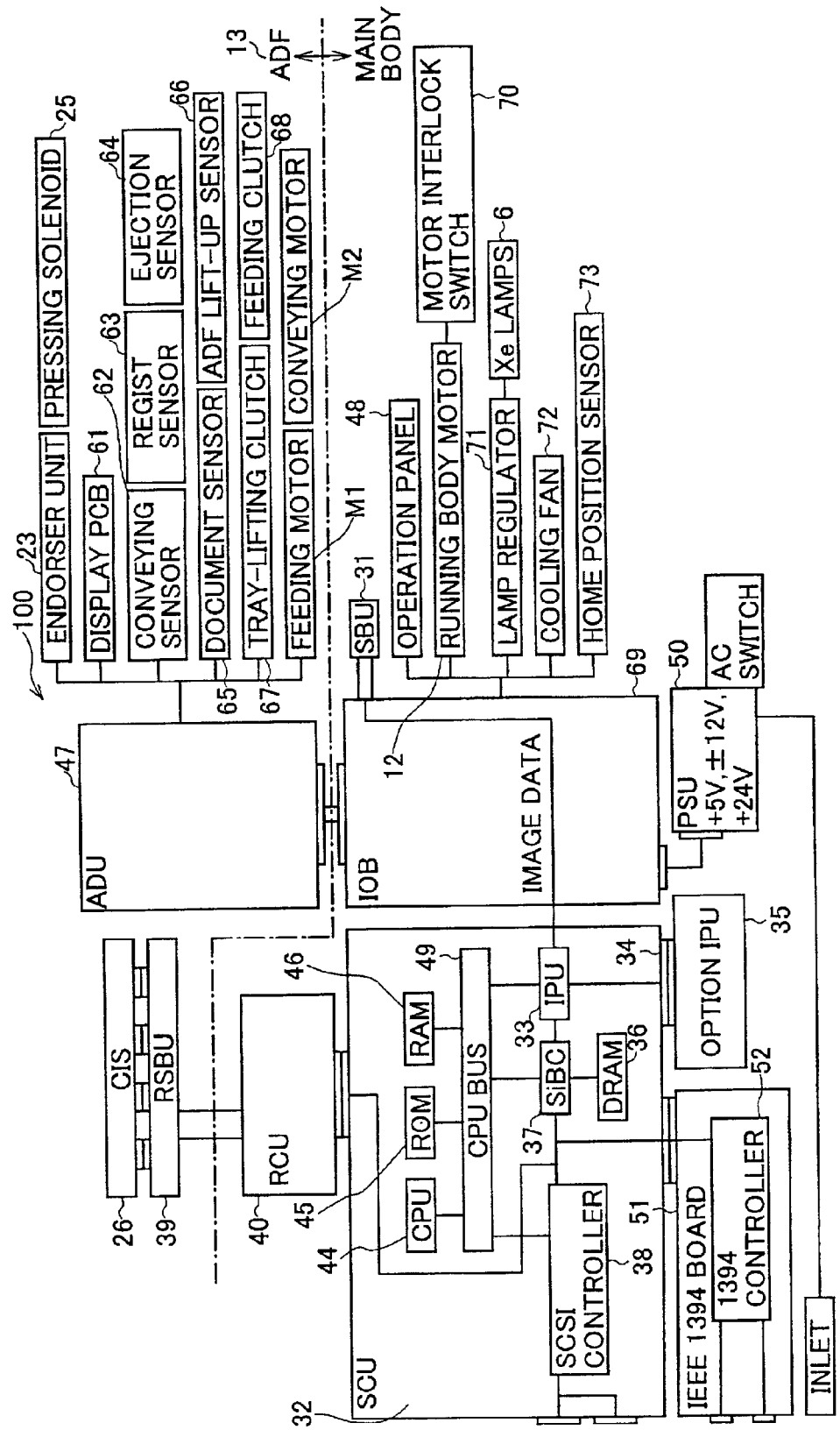
FIG. 2 is a block diagram showing an electrical control system of the image scanner.

FIG. 1 is a longitudinal sectional view of the image scanner 100, and FIG. 2 is a block diagram showing an electrical control system of the image scanner 100. As show in FIG. 1, the image scanner 100 basically includes a double-side simultaneous reading unit 3 including a one-side reading unit 1 which can freely select a document fixing mode or a document conveying mode, and a later-installable reverse side reading unit 2. Therefore, to a user who does not need a double-side simultaneous reading function, an image scanner with only the one-side reading unit 1 is provided.

First, a description will be given of a structure of the one-side reading unit 1. The one-side reading unit 1 includes a contact glass 4 on which a document sheet (not shown) is placed, and a first running body 7 having a reflector 5 and illuminating lamps (xenon lamps) 6 mounted thereon. The first running body 7 is disposed so as to be freely movable in a vertical scanning direction A indicated by a double-headed arrow in FIG. 1. In the optical path of a reflected light from the first running body 7, a second running body 9 that turns back the optical path by two reflectors 8 is disposed so as to be freely movable in the vertical scanning direction A. At the end of the optical path of the reflected light from the second running body 9, a charge coupled device (CCD) 11 is disposed with an imaging lens 10 being interposed between the CCD 11 and the reflectors 8 in the optical path.

A running body motor 12 including a stepping motor is linked to the first and second running bodies 7 and 9 with pulleys or wires so that the first and second running bodies 7 and 9 are movable in the same vertical scanning direction A with a speed ratio of 2:1. By this movement of a reading unit 60 including the first and second running bodies 7 and 9, the image of the document sheet placed on the contact glass 4 is scanned and read in the vertical scanning direction A by the CCD 11.

This scanning and reading of the document sheet by the one-side reading unit 1 is performed under the setting of a book mode that is the document-fixing mode. However, other than the above-described book mode, an automatic document feeder (ADF) mode that is the document conveying mode is set in the image scanner 100 as a freely selectable operation mode. Under the setting of the ADF mode, with the reading unit 60 including the running bodies 7 and 9 being disposed at a standstill reading position B that is a home position, an ADF 13 sequentially conveys document sheets (not shown) in the vertical scanning direction A so that the image data of the document sheets is scanned and read.

The ADF 13 includes a document tray 14, a pickup roller 15, a pair of resist rollers 16, a conveying drum 17, a pair of conveying rollers 18, and a pair of ejecting rollers 19, and sequentially conveys the document sheets in the vertical scanning direction A so that the document sheets pass the standstill reading position B to be ejected onto an ejection tray 20. The ejection tray 20 is formed on the upper surface of a document pressing plate 21, which is provided on the contact glass 4 so as to be freely opened and closed. As shown in FIG. 2, a feeding motor M1 including a stepping motor is linked to the pickup roller 15 and the resist rollers 16 by a train of gears, and a conveying motor M2 including a stepping motor is linked to the conveying drum 17, the conveying rollers 18, and the ejecting rollers 19 by a train of gears. In the ADF 13, an endorser unit 23 and an endorser platen 24 are disposed between the conveying rollers 18 and the ejecting rollers 19. The endorser unit 23 includes a printing unit (not shown) including alphanumerical stamps impregnated with ink, and a pressing solenoid 25 pressing the printing unit to the side of the endorser platen 24. A read document is stopped on the endorser unit 23 to be fixed in a pressing direction by the endorser platen 24 so that alphabetical letters and numbers can be printed on a surface of the document by the pressure of the printing unit of the endorser unit 23.

Next, a description will be given of the reverse side reading unit 2, which is a later-installable optional member. The reverse side reading unit 2 includes a contact-type image sensor (CIS) 26 and a white roller 27, which are installed later in a reading position C set between the conveying drum 17 and the conveying rollers 18 in the path in which the document sheets are conveyed (hereinafter referred to as a conveying path). The CIS 26 reads a side of a document sheet which side is reverse to the side of the document sheet read by the CCD 11, and is disposed above the conveying path to face downward. The CIS 26 is a non-magnifying-type photoelectric transduction element integrally formed of lamps for illuminating the reverse side of the document sheet, a non-magnifying lens, and a sensor array. The white roller 27 positioned opposite to the CIS 26 across the conveying path is also used as a white member for a shading correction at the time of a reading by the CIS 26.

The image scanner 100 houses a unit board forming a later-described electrical system in its lower inside portion. Here, a description will be given, with reference to FIG. 2, of a block structure and a function of the electrical system of the image scanner 100.

In the CCD 11 provided on a sensor board unit (SBU) 31, first, a reflected light from a read document made incident on the CCD 11 is converted into analog image data having voltage values corresponding to its light intensity. Then, the analog image data is divided into image data of reading elements positioned at the odd bits of the CCD 11 and image data of reading elements positioned at the even bits of the CCD 11 and is outputted from the CCD 11 so as to be processed with a low-frequency clock signal. In an analog processing circuit (not shown) formed on the SBU 31, a dark electric potential part of this analog signal is eliminated, the odd-bit and even-bit image data are synthesized, and a gain adjustment is performed so that the analog signal has a predetermined amplitude. Thereafter, the analog signal is inputted to an analog-to-digital (A/D) converter (not shown) to be digitized.

The digitized image data is binarized after processes such as a shading correction, a gamma control, and a modulation transfer function (MTF) correction are performed thereon by an image processing unit (IPU) 33 on a scanner control unit (SCU) 32. The binarized image data is outputted as a video signal together with a page synchronizing signal, a line synchronizing signal, and an image clock.

The video signal outputted from the IPU 33 is inputted to an option IPU 35 via a connector 34. The video signal inputted to the option IPU 35 is subjected to predetermined image processing in the option IPU 35, and is again inputted to the SCU 32. The function of a reading means is thus realized.

The video signal inputted again to the SCU 32 is inputted to a selector (not shown). The video signal outputted from the IPU 33 is also inputted to the selector so as to determine whether to perform the image processing in the option IPU 35. The video signal outputted from this selector is inputted to a scanner image buffer controller (SiBC) 37 controlling a dynamic random access memory (DRAM) 36 serving as image memory, and is stored in the DRAM 36 as image data. The image data stored in the DRAM 36 is transferred to the external host computer via, for instance, a SCSI controller 38 or 1394 controller 52 provided on an IEEE (Institute of Electrical and Electronic Engineers) 1394 board connected to the SCU 32. That is, in the digital image reading apparatus according to this embodiment, two kinds of general-purpose interfaces of IEEE 1394 and SCSI are selectably employed as a communication means in an image data transfer means for transferring the image data to the host computer. Therefore, the digital image reading apparatus of the present invention can be connected to a large number of external devices without developing a new external device interface.

On the other hand, analog image data optical-electrical-transduced in the CIS 26 is converted into digital image data on a reverse sensor board unit (RSBU) 39 for a reverse side of a document in the ADF 13. The digitized image signal is subjected to a shading correction on the RSBU 39 to be outputted to a reverse side control unit (RCU) 40 included in a main body. The RCU 40 includes a DRAM, an SiBC controlling the DRAM, and an NIPU (not shown, respectively). The image data is temporarily stored in the DRAM to be transferred to the SCU 32. A switching between the image data transferred from the RCU 40 to the SCU 32 and the image data outputted from the SiBC 37 provided on the SCU 32 is possible so that one of the two image data is selected to be transferred to the SCSI controller 38 or the 1394 controller 52. An ADF driving unit (ADU) 47 serves to relay a power supply to electric components used for the ADF 13. As shown in FIG. 2, the ADU 47, which includes a motor driver and I/O connectors, is connected to the endorser unit 23, the pressing solenoid 25, a display PCB 61, a conveying sensor 62, a resist sensor 63, an ejection sensor 64, a document sensor 65, an ADF lift-up sensor 66, a tray-lifting clutch 67, a feeding clutch 68, the feeding motor M1, and the conveying motor M2.

The ADU 47 is also connected to an input/output board (IOB) 69 including a motor driver and I/O connectors. The IOB is connected to the SBU 31, an operation panel 48, the running body motor 12, a lamp regulator 71, a cooling fan 72, an optional network operation panel (not shown), an LCD (not shown), an LED (not shown), and switches including a ten key (not shown). The running body motor 12 is connected to a motor interlock switch 70, and the lamp regulator 71 is connected to the illuminating (xenon) lamps 6. The IOB 69 is also connected to a power supply unit (PSU) 50 including an AC switch. The PSU is connected to an inlet 74.

A CPU 44 performing centralized control of each part, a ROM 45 prestoring fixed data such as a control program, and a RAM 46 serving as a work area are mounted on the SCU 32 and connected to a CPU bus 49. The CPU bus 49 is also connected to the IPU 33, the SiBC 37, and the SCSI controller 38. The CPU 44 operates to control the SCSI controller 38 or the 1394 controller 52 so as to communicate with the external host computer.

The operation panel 48 used as a keyboard and a display is provided on the outer surface of the image scanner 100 to be connected to the CPU 44. An abort switch, a start switch, and a mode selection switch for switching between the document fixing mode and the document conveying mode are provided on the operation panel 48. When these switches are pressed down, the CPU 44 detects the operations of the switches via an input port.

In addition, as a function performed under the control of the CPU 44, the image scanner 100 of this embodiment includes the function of an image parameter setting means for setting parameters with respect to the reading of a document image in the reading unit 60 based on communication with the external apparatus. The reading-related parameters include the number of pixels in a main (horizontal) scanning area, resolution (dpi) in the vertical scanning direction A, image composition (binary or multivalue), an image data transfer rate, a document size, and the number of document sheets. These parameters are communicated from the external host computer to be temporarily stored and set in the RAM 46.

Further, as a function performed under the control of the CPU 44, the image scanner 100 of this embodiment includes a vertical scanning rate setting means for setting a reading rate (inch/sec) in the vertical scanning direction A (vertical scanning reading rate) to a desired value in reading a document image. More specifically, the CPU 44 controls the driving pulses of the running body motor 12, the feeding motor M1, and the conveying motor M2 to control the operation timings thereof. That is, the CPU 44 controls the rotation speeds of the running body motor 12, the feeding motor M1, and the conveying motor M2 so as to variably set the vertical scanning reading rate at a time of reading the document image.

Moreover, as a function performed under the control of the CPU 44, the image scanner 100 of this embodiment includes a computation means for computing the total image data amount of a read image from the reading-related parameters set by the image parameter setting means. Specifically, the total image data amount of the read image can be obtained by multiplying the number of pixels in the main scanning area by the image composition (1/8 in the case of binary data, and 1 in the case of multivalue data), the resolution (dpi) in the vertical scanning direction A, and the number of vertical scanning lines. The number of vertical scanning lines can be obtained from the document size and the number of document sheets.

Next, a description will be given of a data transfer method based on SCSI employed as one of the communication means. The data transfer method based on SCSI is classified into a basic anachronous transfer and a synchronous transfer whose transfer rate is increasable according to a classification based on transfer rates. The anachronous transfer forms the basis of the transfer method, and information other than data, such as a message or a status, is transferred by the anachronous transfer. Specifically, the anachronous transfer is performed by a handshake protocol using REQ/ACK, and allows a transfer of, for instance, approximately 1.5 MB of data per second. On the other hand, the synchronous transfer is a mode usable only in a data phase. That is, the synchronous transfer is a mode whose object is a high-speed data transfer. Consent between a target and an initiator is required for the use of this synchronous transfer mode in a data transfer. This consent is made by determining two values of a "REQ/ACK offset value" and a minimum transfer synchronization by exchanging messages of "synchronous data transfer requests". This synchronous transfer mode allows a high-speed transfer of, for instance, approximately 10 MB of data per second.

Next, a brief description will be given of IEEE 1394 employed as one of the communication means and a data transfer rate thereof. IEEE 1394-1995 is a fast serial bus standard standardized by the IEEE in 1995, which standard is centered on the physical layer (PHY) and the link layer (LINK). IEEE 1394-1995 is a standard for hardware and software for 100 Mbps, 200 Mbps, and 400 Mbps data transfers, and the future establishment of a standard for 800 Mbps, 1.6 Gbps, and 3.2 Gbps data transfers is now under consideration. IEEE 1394 has a characteristic function for plug and play, and a multimedia data transfer, that is, a function securing a band for transferring video or audio data to allow a real-time transfer (isochronous transfer). This function is disclosed, for instance, in Japanese Laid-Open Patent Applications No. 10-257119 and No. 11-17855.

The data transfer method of IEEE 1394 is categorized in the isochronous transfer and the asynchronous transfer. The isochronous transfer has an advantage that its data transfer rate is assured. Specifically, the isochronous transfer can transfer at least one packet for every 125 μsec per channel, set talkers and listeners of up to 64 channels per node, and determine the maximum packet size for each of the data transfer rates of 100, 200, and 400 Mbps. On the other hand, the asynchronous transfer can be performed only after every isochronous transfer is completed. That is, while the isochronous transfer has the concept of channel and is somewhat similar to the broadcast that defines a talker and a listener, the asynchronous transfer is a transfer from point to point. Every transaction has the IDs of a sender and a recipient related thereto.

Next, a comparison will be made between the data transfer rates of SCSI and IEEE 1394. The data transfer rate of SCSI is 5 MB per second in the case of the asynchronous transfer and 10 MB per second in the case of synchronous transfer. The data transfer rate of IEEE 1394 is 100, 200, or 400 Mbps. Therefore, it is concluded that SCSI has the image data transfer rate lower than that of IEEE 1394. That is, under the conditions of the same resolution and the same reading area, the number of intermittent operations with suspensions is decreased to allow a stable, high-quality image reading by setting the vertical scanning reading rate to be low by the CPU 44 in the case of employing SCSI as the communication means. In setting the vertical scanning reading rate, in order to detect the image data transfer rate, a synchronization data transfer request message is employed in the case of SCSI, and transfer rate information in a packet is employed in the case of IEEE 1394.

Further, according to this embodiment, in a reading operation of reading a document image and sequentially transferring the image data of the read image to the external apparatus, the CPU 44 serves to control the vertical scanning rate setting means based on the total image data amount of the read image computed by the computation means so as to set the vertical scanning reading rate.

More particularly, in the document image reading operation that the CPU 44 is caused to perform by the control program stored in the ROM 45 under the setting of the book mode that is the document fixing mode, as previously described, the CPU 44 controls the running body motor 12 for moving the first and second running bodies 7 and 9 via the motor driver, and at the same time, controls the transfer of the image data stored in DRAM 36 to the external host computer via the 1394 controller 52 provided on the IEEE 1394 board 51 connected to the SCSI controller 38 or the SCU 32. In this case, to prevent the image data from being gradually accumulated in the DRAM 36, the CPU 44 sets the vertical scanning reading rate based on the total image data amount of the read image computed by the computation means so that the read data amount on the side of the CCD 11 becomes equal to or approaches the data transfer amount.

Further, the CPU 44 of the image scanner 100 of this embodiment compares the storage capacity of the DRAM 36 and the total image data amount of the read image computed by the computation means. In this comparison, if the total image data amount of the read image is smaller than the storage capacity of the DRAM 36, the CPU 44 controls the vertical scanning rate setting means to set the vertical scanning reading rate to a value higher than that set based on the total image data amount of the read image, and controls the running body motor 12 via the motor driver based on the higher reading rate. If the total image data amount of the read image is smaller than the storage capacity of the DRAM 36 as in the above-described case, the DRAM 36 is prevented from being filled up with the image data. Therefore, the running body motor 12 is free of speed control operations of gradually increasing and decreasing the speed thereof, thus preventing deterioration of the image quality. Accordingly, if the total image data amount of the read image is smaller than the storage capacity of the DRAM 36 in a reading operation expecting a large data transfer amount of image data, such as a color or multivalue reading operation, a reading time can be shortened and thus the performance of the apparatus can be improved since the vertical scanning reading rate can be set to a value higher than that set based on the total image data amount of the read image.

The description has been given above of the reading operation of a document image performed by the CPU 44 under the setting of the book mode that is the document fixing mode. However, the present invention is not limited to this, but is also applicable under the setting of the ADF mode that is the document conveying mode. In this case, the CPU 44 controls the feeding motor M1 and the conveying motor M2 sequentially conveying the document sheets in the vertical scanning direction A with respect to the reading unit 60, which includes the running bodies 7 and 9, and is fixedly disposed in the standstill reading position B that is the home position.

Figure 3:
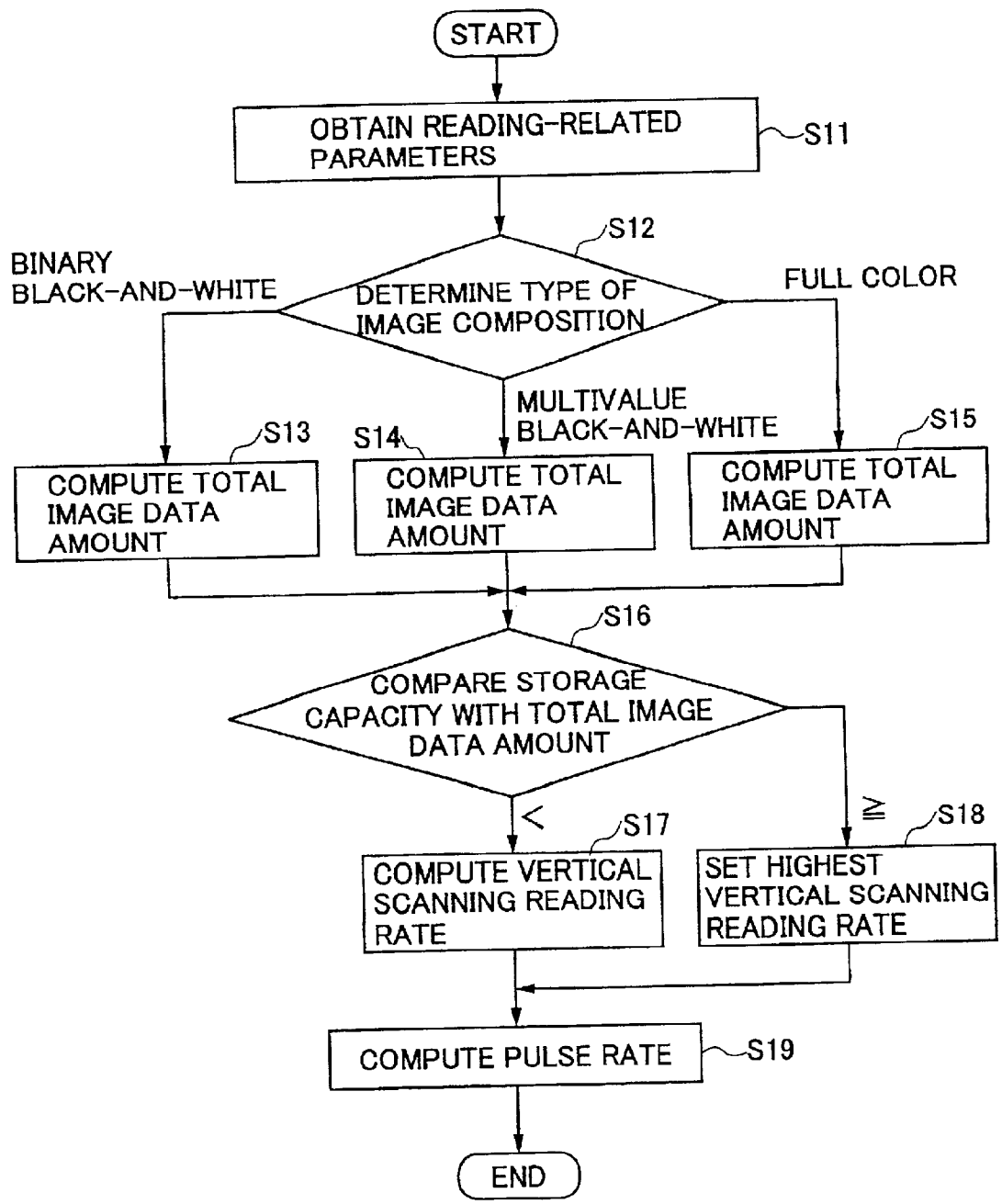
FIG. 3 is a flowchart of a control sequence of a CPU shown in FIG. 2.

FIG. 3 is a flowchart of the above-described control sequence.

When the control sequence shown in FIG. 3 is started, the CPU 44 obtains the reading-related parameters from the external host computer in step S11. The parameters obtained in step S11 are the number of pixels in the main scanning area, the number of vertical scanning lines, the resolution, and the image composition. Next, in step S12, the CPU 44 determines whether the image composition is in binary black-and-white, in multivalue black-and-white, or in full color.

If the image composition is in binary black-and-white, in step S13, the CPU 44 computes the total image data amount from the following formula.

$$DA=PN \div 8 \times LN,$$

wherein DA is the total image data amount, PN is the number of pixels in the main scanning area, and LN is the number of vertical scanning lines. These abbreviations are common to the following formulas.

If the image composition is in multivalue black-and-white, in step S14, the CPU 44 computes the total image data amount from the following formula.

$$DA=PN \times LN$$

If the image composition is in full color, in step S15, the CPU 44 computes the total image data amount from the following formula.

$$DA = PN \times 3 \times LN$$

After thus computing the total image data amount, in step S16, the CPU 44 compares the storage capacity of the DRAM 36 with the total image data amount. Here, the storage capacity of the DRAM 36 means its storage capacity available at a time of performing step S16. If the storage capacity of the DRAM 36 is equal to or larger than the total image data amount, in step S18, the CPU 44 set the vertical scanning reading rate to the highest value. If the vertical scanning reading rate is set to the highest value, a scanning operation can be performed in the shortest period. However, the vertical scanning reading rate does not always have to be set to the highest value. The reading time can be shortened by setting the vertical scanning reading rate to a value higher than a value to which the vertical scanning reading rate is currently set. On the other hand, if it is determined in step S16 that the storage capacity of the DRAM 36 is smaller than the total image data amount, in step S17, the CPU 44 computes the vertical scanning reading rate by using the following formula.

$$VR = LN \div RE \times 25.4 \div (DA \div I/F\ TR).$$

wherein VR is the vertical scanning reading rate, RE is the resolution, I/F TR is the data transfer rate of the interface such as SCSI or IEEE 1394 employed to transfer the read data from the DRAM 36 to the external apparatus, and 25.4 means that one inch corresponds to 25.4 mm.

In step S19, the CPU 44 computes the pulse rate of the driving pulses that drive the running body motor 12 including the stepping motor, or the feeding and conveying motors M1 and M2 each including the stepping motor. The pulse rate is a reading time per pulse and is obtained by dividing a moving distance per pulse of the reading unit 60 or a document sheet by the vertical scanning reading rate.

The description of the embodiment of the present invention has been given above. The digital image reading apparatus according to the present invention includes, in addition to an image scanner, a digital copying machine or a facsimile machine with a function of transferring data to an external apparatus.

The present invention is not limited to the specifically disclosed embodiment, but variations and modifications can be made without departing from the scope of the present invention.

The present invention is based on Japanese priority applications No. 2000-036010 filed on Feb. 15, 2000, and No. 2001-32693 filed on Feb. 8, 2001, the entire contents of which are hereby incorporated by reference.

What is claimed is:

1. A digital image reading apparatus, comprising:
a reader configured to optically read an image of a document to output digital image data;
first setting means for setting a reading rate in a given scanning direction to a desired value;
an image memory configured to temporarily store the image data;
second setting means for setting parameters related to reading the image of the document based on communication with an external apparatus,
wherein the parameters include at least one of a number of pixels in a main (horizontal) scanning area, resolution (dpi) in a vertical scanning area, image composition (binary or multivalue), an image data transfer rate, a document size, and a number of document sheets; and
computation means for computing a total amount of the image data from the parameters,
wherein the first setting means sets the reading rate based on the total amount of the image data.

2. The apparatus as claimed in claim 1, wherein the first setting means resets the reading rate to a value higher than a value to which the reading rate is set when the total amount of the image data is smaller than a storage capacity of the image memory.

3. The apparatus as claimed in claim 1, further comprising:
transfer means for transferring the image data from the image memory to the external apparatus by communication means.

4. The apparatus as claimed in claim 3, wherein IEEE 1394 is employed as the communication means.

5. The apparatus as claimed in claim 3, wherein SCSI is employed as the communication means.

6. The apparatus as claimed in claim 1, wherein said first setting means sets the reading rate by controlling a stepping motor involved in scanning in the given scanning direction.

7. The apparatus as claimed in claim 1, wherein the first setting means primarily sets the reading rate on the basis of an available capacity of said image memory.

8. A digital image reading apparatus, comprising:
a reading part configured to optically read an image of a document to output digital image data;
a first setting part configured to set a reading rate in a given scanning direction to a desired value;
an image memory for temporarily storing the image data;
a second setting part configured to set parameters related to reading the image of the document based on communication with an external apparatus,
wherein the parameters include at least one of a number of pixels in a main (horizontal) scanning area, resolution (dpi) in a vertical scanning area, image composition (binary or multivalue), an image data transfer rate, a document size, and a number of document sheets; and
a computation part configured to compute a total amount of the image data from the parameters,
wherein the first setting part sets the reading rate based on the total amount of the image data.

9. The apparatus of claim 8, wherein the first setting part primarily sets a reading rate on the basis of an available capacity of said image memory.

10. The apparatus of claim 8, wherein the first setting part resets a reading rate to a value higher than a value to which the reading rate is set when the total amount of the image data is smaller than a storage capacity of the image memory.

11. The apparatus of claim 8, further comprising:
a transferring part which transfers the image data from the image memory to the external apparatus by a communication link.

12. The apparatus of claim 11, wherein IEEE 1394 is employed as the communication link.

13. The apparatus of claim 11, wherein SCSI is employed as the communication link.

14. The apparatus of claim 8, wherein said first setting part sets a reading rate by controlling a stepping motor involved in scanning in a given scanning direction.

* * * * *